United States Patent [19]

Honda et al.

[11] Patent Number: 5,510,410
[45] Date of Patent: Apr. 23, 1996

[54] AUTODEPOSITION COATING COMPOSITION

[75] Inventors: Takumi Honda; Kazuhisa Naito; Mitsuyuki Koga, all of Kanagawa, Japan

[73] Assignee: Henkel Corporation, Plymouth Meeting, Pa.

[21] Appl. No.: 256,913

[22] PCT Filed: Jan. 15, 1993

[86] PCT No.: PCT/US93/00138

§ 371 Date: Jul. 29, 1994

§ 102(e) Date: Jul. 29, 1994

[87] PCT Pub. No.: WO93/15155

PCT Pub. Date: Aug. 5, 1993

[30] Foreign Application Priority Data

Jan. 31, 1992 [JP] Japan ..................................... 4-040570

[51] Int. Cl.$^6$ ............................... C08K 3/10; C08K 5/51; C08K 5/04
[52] U.S. Cl. .......................... 524/407; 524/406; 524/183; 524/147; 524/398
[58] Field of Search .................................... 524/406, 407, 524/398, 183, 147

[56] References Cited

FOREIGN PATENT DOCUMENTS 0046268  2/1982  European Pat. Off. .......... B05D 7/16

*Primary Examiner*—Paul R. Michl
*Assistant Examiner*—LaVonda R. DeWitt
*Attorney, Agent, or Firm*—Ernest G. Szoke; Wayne C. Jaeschke; Daniel S. Ortiz

[57] ABSTRACT

The invention is an aqueous autodeposition coating composition that produces a film that has a better adherence and corrosion resistance than the films formed by the prior-art coating compositions, but which does so without a rinse treatment (for example, a chromium containing solution, rinse) prior to film curing. The aqueous autodeposition coating composition has a pH of 1.6 to 5.0 and contains (i) water-dispersible or water-soluble organic film-forming resin, (ii) at least one of fluoride ions or fluoride ions and complex fluoride ions, (iii) hexavalent chromium ion or hexavalent chromium ion+trivalent chromium ion, and (iv) tungstate ion and/or molybdate ion.

17 Claims, No Drawings

AUTODEPOSITION COATING COMPOSITION

FIELD OF THE INVENTION

The present invention relates to an aqueous autodeposition coating composition in the form of an acidic coating composition (pH approximately 1.6 to 5) that contains water-dispersible or water-soluble organic film-forming resin, fluoride ion and/or complex fluoride ion, chromium ion (hexavalent chromium ion or hexavalent chromium ion+trivalent chromium ion), and tungstate ion and/or molybdate ion. This aqueous autodeposition coating composition is capable of forming a highly corrosion-resistant, strongly adherent resin film on metal surfaces when brought into contact with the surface of a metal, for example, a ferriferous metal, zinciferous metal, aluminiferous metal, magnesium-based metal, and so forth.

RELATED ART

Autodeposition coating compositions are acidic coating compositions that contain organic film-forming resin and that can form a resin film on a metal surface when brought into contact with the metal surface. Autodepositing coating compositions are disclosed in, for example, Japanese Patent Publication Number Sho 47-17630 [17, 630/1972], Japanese Patent Publication Number Sho 48-14412 [14, 412/1973], Japanese Patent Publication Number Sho 52-21006 [21, 006/1977], Japanese Patent Publication Number Sho 52-35692 [35, 692/1977], Japanese Patent Publication Number Sho 53-15093 [15, 093/1978], Japanese Patent Publication Number Sho 53-16010 [16, 010/1978], Japanese Patent Publication Number Sho 53-44949 [44, 949/1978], Japanese Patent Application Laid Open [Kokai or Unexamined] Number Sho 60-58474 [58,474/1985], Japanese Patent Application Laid Open Number Sho 61-168673 [168,673/1986], and Japanese Patent Application Laid Open Number Sho 61-246267 [246,267/1986].

A characteristic feature of the known coating compositions is their ability to lay down a resin film upon the immersion of a clean metal surface in the particular coating composition. Moreover, the coating film's thickness and weight increase with immersion time. In the case of these compositions, the chemical activity of the coating composition overlying the metal surface (metal ion eluted from the metal surface by etching induces association of the resin particles with resulting deposition on the metal surface) results in the efficient deposition of a resin film on the metal surface without the application, as in electrodeposition, of an external electrical source.

The demand for more simple processes (contraction) has been very strong in recent years with regard to the painting of metals, for example, as typified by coating lines for automobile bodies. However, in the autodeposition coating processes (painting) disclosed in U.S. Pat. No. 3,647,567, U.S. Pat. No. 4,030,945, Japanese Patent Publication Number Sho 53-15093, and Japanese Patent Application Laid Open Number Sho 61-168673, a rinse treatment with a chromium-containing solution or aqueous alkali solution, etc. (post-treatment directly after autodeposition) is implemented prior to film curing (prior to baking/drying) in order to provide an ultimately produced film with better corrosion resistance and better adherence.

One approach to process contraction would be the elimination of this rinse treatment step. However, elimination of the rinse treatment step leads to a substantial deterioration in film adherence and corrosion resistance and to a significant deterioration in film quality. In fact, not only is a simpler process required, but an even better performance is required of the film since the performance of the prior coatings has not been entirely satisfactory with regard to critical properties, particularly adherence and corrosion resistance. An important problem within the sphere of process contraction and coating performance is to achieve improvements in film adherence and corrosion resistance while at the same time omitting the rinse treatment prior to film cure.

The present invention takes as its object the introduction of a film which has a much better adherence and corrosion resistance than the films formed by prior-art coating compositions, but which is produced without a rinse treatment (for example, with a chromium-containing solution) prior to film curing.

BRIEF DESCRIPTION OF THE INVENTION

The present invention is an aqueous autodeposition coating composition that has a pH of about 1.6 to about 5.0 and contains (i) a water-dispersible or water-soluble organic film-forming resin, (ii) at least one of fluoride ions or fluoride ions and complex fluoride ions, (iii) hexavalent chromium ion or hexavalent chromium ion and trivalent chromium ion, and (iv) at least one of tungstate ions and molybdate ions.

A highly adherent, strongly corrosion-resistant resin film is formed on the metal surface when the aqueous autodeposition coating composition of the present invention is brought into contact with a metal surface, for example, the surface of ferriferous, zinciferous, aluminiferous, or magnesium-based metal.

The present invention can provide films with a better adherence and corrosion resistance than the films afforded by prior autodeposition coating compositions precisely since it comprises an acidic coating composition (pH approximately 1.6 to 5) that contains an organic film-forming resin, fluoride ion or fluoride ion and complex fluoride ion, chromium ion with its excellent rust-inhibiting activity for metals, and also tungstate ion and/or molybdate ion.

In addition, the present invention provides a highly adherent, highly corrosion-resistant film without having to carry out the post-treatments (pre-film-cure rinse treatment, for example, with a chromium-containing solution) that have been required to improve the adherence and corrosion resistance of films produced by autodeposition coating compositions.

DETAILED DESCRIPTION OF THE INVENTION

A resin of the type disclosed in Japanese Patent Application Laid Open Number Sho 61-168673 is an example of a resin useful as the organic film-forming resin in the present invention.

The organic film-forming resin which can be useful in the practice of the present invention can comprise: urethane resins, epoxy resins, polyester resins, and polymer resins composed of one or more monomers selected from methyl acrylate, ethyl acrylate, n-butyl acrylate, 2-hydroxyethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, acrylonitrile, ethylene, styrene, vinyl chloride, vinylidene chloride, vinyl acetate, acrylic acid, methacrylic acid, and the like.

The organic film-forming resin useful in the present invention can be anionic, cationic, nonionic, or amphoteric and is not restricted in this regard. The content of resin solids in the coating composition preferably falls within the range of 5 to 550 g/L and more preferably falls within the range of 50 to 100 g/L.

Sources for the fluoride ion and complex fluoride ion used in the invention are, for example, zirconium hydrogen fluoride, titanium hydrogen fluoride, silicon hydrogen fluoride, boron hydrogen fluoride, hydrofluoric acid, and the ammonium, lithium, sodium, and potassium salts of the preceding acids. The content of fluoride and complex fluoride ion in the coating composition preferably falls within the range of 0.1 to 5 g/L as fluorine and more preferably falls within the range of 0.5 to 3 g/L as fluorine.

The pH of the coating composition of the present invention should be maintained within the range of approximately 1.6 to 5. Formation of the resin film becomes problematic when the pH is substantially outside this range. The pH of the coating composition may be regulated using one or more acids selected from the following: inorganic acids selected from the acids listed above as sources of fluoride and complex fluoride ion and their salts, as well as nitric acid, phosphoric acid, and boric acid; and organic acids selected from phytic acid and tannic acid. The addition of nitric acid, phosphoric acid, boric acid, phytic acid, or tannic acid has the effect of improving film adherence to the substrate.

The hexavalent chromium ion used in the present invention can be supplied to the coating composition as chromic acid or a chromate salt compound. The chromic acid can be supplied as an aqueous solution of chromic anhydride or chromic acid. The chromate salt can be supplied in the form of the ammonium, sodium, barium, potassium, strontium, zinc, etc., salt of chromic acid or dichromic acid.

The hexavalent chromium ion passivates metal surfaces and thereby produces an excellent rust-inhibiting activity for metals. A portion of the hexavalent chromium ion is converted to trivalent chromium ion by reduction on the metal surface during the course of film formation (deposition) or by reduction by the functional groups in the resin when the film is dried by heating. This trivalent chromium ion acts to make the hexavalent chromium ion less soluble in water and also functions as a crosslinker for the resin.

The trivalent chromium ion used in the present invention can be supplied by reduction of part of the hexavalent chromium ion or by the dissolution of a trivalent chromium compound, e.g., chromium hydroxide, chromium carbonate, chromium hydroxide, etc., in an aqueous chromic acid solution.

While the hexavalent chromium ion acts to inhibit metal corrosion, it is readily soluble in water and is easily eluted from the film when the film is brought into contact with moisture. This results in a substantial deterioration in the film's rust-inhibiting activity. The trivalent chromium bonds with hexavalent chromium to form a sparingly water-soluble chromium chromate, and this inhibits elution of the hexavalent chromium from the film and thus supports retention of the rust-inhibiting activity. The trivalent chromium also bonds with the functional groups in the resin and thereby functions to substantially raise the molecular weight of the resin and improve the corrosion resistance of the film formed on the metal.

The total chromium ion content in the coating composition should be 0.1 to 20 g/L and preferably is 0.5 to 2 g/L. When both the hexavalent and trivalent chromium ions are present, the hexavalent chromium ion/trivalent chromium ion ratio (weight ratio) preferably falls within the range of 0.6 to 5. When the ratio falls substantially outside this range, the hexavalent chromium will again become readily elutable from the film and the stability of the coating composition itself will be impaired. The hexavalent chromium and/or trivalent chromium are taken into the resin film simultaneously with formation of the resin film.

A critical feature of the present invention is the additional presence of tungstate ion and/or molybdate ion in the coating composition that contains organic film-forming resin, fluoride or fluoride ion and complex fluoride ion, and chromium ion (hexavalent chromium ion or hexavalent chromium ion plus trivalent chromium ion).

It is though that the tungstate ion and/or molybdate ion present in the aqueous coating composition of the present invention forms a complex with a portion of the chromium ion. The chromium in this complex appears to substitute for metal ion eluted from the surface of the metal workpiece, which results in an efficient deposition of the chromium onto the surface of the metal workpiece and ultimately coverage of the metal surface by chromium and organic film-forming resin. In the case of the prior-art chromium rinse posttreatments, the chromium (ion) taken into the resin film is largely present relatively near the surface of the resin film. In contrast, due to the presence of tungstate ion and/or molybdate ion in the coating composition of the present invention, the chromium (ion) taken into the resin film is largely present both near the metal surface and relatively near the surface of the resin film. This results in the production of a film having an excellent adherence and corrosion resistance that cannot be achieved by the prior-art rinse treatments (chromium-containing solution, etc.).

The tungstate ion used in the present invention can be supplied in the form of tungstic acid, sodium tungstate, calcium tungstate, potassium tungstate, etc. The molybdate ion used in the present invention can be supplied in the form of molybdic acid, sodium molybdate, calcium molybdate, potassium molybdate, etc. The content of tungstate ion and molybdate ion in the coating composition should be 0.1 to 5 g/L and is preferably 0.3 to 2 g/L.

The coating composition of the present invention may also contain pigment(s) on an optional basis.

Examples of the present invention and comparison examples are provided below.

COMPOSITION PRODUCTION EXAMPLES A THROUGH O

Aqueous coating compositions were prepared using an acrylic emulsion (41.5% solids, Rhoplex WL-91 from the Rohm & Haas Company) and the other compounds as reported in Table 1 (brought to a total of 1 L with de-ionized water).

EXAMPLES 1 THROUGH 15

The aqueous coating compositions prepared in Composition Production Examples A through O were used in these examples. The aqueous coating composition baths were held at approximately 20° to 22° C. A cleaned cold-rolled steel sheet, galvannealed hot-dipped zinc-plated steel sheet electrogalvanized steel sheet, or aluminum sheet (size=70×150×1 mm in all cases) was treated in the particular example by immersion for 120 seconds. After a water rinse, the sample was dried in an oven for 20 minutes at 180° C. and was then submitted to the various tests. The results of the performance testing of the test sheets are reported in Table 2.

COMPARISON EXAMPLE 1

The aqueous coating composition prepared in Composition Production Example P was used in this comparison example. The aqueous coating composition bath was held at approximately 20° to 22° C. A cleaned cold-rolled steel sheet (size=70×150×1 mm) was treated by immersion for 120 seconds. After a water rinse, the sample was dried in an oven for 20 minutes at 180° C. and was then submitted to the various tests. The results of the performance testing of the test sheet are reported in Table 2.

COMPARISON EXAMPLE 2

The aqueous coating composition prepared in Composition Production Example P was used in this comparison example. The aqueous coating composition bath was held at approximately 20° to 22° C. A cleaned cold-rolled steel sheet (size=70×150×1 mm) was treated by immersion for 120 seconds. After a water rinse, the sample was immersed in an aqueous chromium-containing solution (Palene 60, trademark of Nihon Parkerizing Company, Limited) for 60 seconds at room temperature and then dried in an oven for 20 minutes at 180° C. The sample was subsequently submitted to the various tests, and the results of the performance testing of the test sheet are reported in Table 2.

COMPARISON EXAMPLES 3 TO 5

The aqueous coating composition prepared in Composition Production Example Q was used in these comparison examples. The aqueous coating composition baths were held at approximately 20° to 22° C. A cleaned cold-rolled steel sheet, galvannealed hot-dipped zinc-plated steel sheet, or electrogalvanized steel sheet (size=70×150×1 mm in all cases) was treated in the particular comparison example by immersion for 120 seconds. After a water rinse, the sample was immersed in an aqueous chromium-containing solution (Palene 60, trademark of Nihon Parkerizing Company, Limited) for 60 seconds at room temperature and then dried in an oven for 20 minutes at 180° C. The sample was subsequently submitted to the various tests, and the results of the performance testing of the test sheets are reported in Table 2.

TEST METHODS AND EVALUATION STANDARDS

1. Film adherence (checkerboard adhesive tape peeling test)

A grid of one hundred 1 mm×1 mm squares was cut in the test sheet and peeled with adhesive tape, and the number of remaining film squares was counted. This test was conducted both before and after immersion in water at 40° C. for 240 hours. The pre-immersion results are reported in row a and the post-immersion results are reported in row b.

2. Film adherence (Dupont impact test)

A 1 kg impacter (diameter=½ inch) was dropped on the test sheet and the impact area was peeled with adhesive tape. The value measured was the highest impacter drop-height at which film peeling did not occur. This test was conducted both before and after immersion in water at 40° C. for 240 hours. The pre-immersion results are reported in row a and the post-immersion results are reported in row b.

3. Corrosion resistance

The test sheet was prepared by cutting a cross in the coating to reach the base metal, and the test sheet was then subjected to salt-spray testing in accordance with JIS Z-2371 (500 hours for the cold-rolled steel sheet, galvannealed hot-dipped zinc-plated steel sheet, and electrogalvanized steel sheet and 1,000 hours for the aluminum sheet). The test sheet was subsequently subjected to tape peeling, and the peel width from the cross cut (one side, mm) was measured.

Coatings with a much better adherence and corrosion resistance than heretofore available from the prior art are formed by contacting metal surfaces with the aqueous autodeposition coating composition of the present invention. Furthermore, this is achieved without having to carry out a rinse treatment, for example, with a chromium-containing solution, prior to film curing.

TABLE I

| Components In The Aqueous Coating Composition (g/L) | | | | | |
|---|---|---|---|---|---|
| Production Example No. | | A | B | C | D |
| Resin (solids) | | 50 | 50 | 80 | 50 |
| $Cr^{6+}$ | | 1.00 | 2.00 | 1.80 | 2.00 |
| $Cr^{3+}$ | | | | | |
| Fluoride or Complex Fluoride | | | | | |
| hydrogen fluoride | (as F) | 1.00 | 0.60 | 0.50 | 1.00 |
| boron hydrogen fluoride | (as F) | | | 0.51 | |
| lithium borofluoride | (as F) | | | | 0.16 |
| zirconium hydrogen fluoride | (as F) | | | | |
| potassium fluozirconate | (as F) | | | | |
| titanium ammonium fluoride | (as F) | | 0.20 | | |
| sodium silicofluoride | (as F) | | | | |
| Inorganic Acids | | | | | |
| nitric acid | | | | | |
| phosphoric acid | | | | | |
| boric acid | | | | 0.40 | 0.40 |

TABLE I-continued

| Components In The Aqueous Coating Composition (g/L) | | | | | |
|---|---|---|---|---|---|
| Organic Acids | | | | | |
| phytic acid | | | | | |
| tannic acid | | | | | |
| Tungsten and Molybdenum Compounds | | | | | |
| tungstic acid | (as WO$_4$) | | | | |
| Na tungstate | (as WO$_4$) | 0.60 | 0.60 | 0.60 | |
| Ca tungstate | (as WO$_4$) | | | | |
| K tungstate | (as WO$_4$) | | | | |
| molybdic acid | (as MoO$_4$) | | | | |
| Na molybdate | (as MoO$_4$) | | | | 0.54 |
| Ca molybdate | (as MoO$_4$) | | | | |
| K molybdate | (as MoO$_4$) | | | | |
| Additives | | | | | |
| ferric fluoride | (as FeF$_3$) | | | | |
| black pigment | (solids) | | | | 1.40 |
| pH | | 3.2 | 3.3 | 3.3 | 3.0 |

| Production Example No. | | E | F | G | H |
|---|---|---|---|---|---|
| Resin (solids) | | 50 | 50 | 50 | 50 |
| Cr$^{6+}$ | | 2.00 | 2.00 | 2.00 | 2.00 |
| Cr$^{3+}$ | | | | | |
| Fluoride or Complex Fluoride | | | | | |
| hydrogen fluoride | (as F) | 0.50 | 0.50 | 1.00 | 1.00 |
| boron hydrogen fluoride | (as F) | | | | |
| lithium borofluoride | (as F) | | | | |
| zirconium hydrogen fluoride | (as F) | 0.60 | | | |
| potassium fluozirconate | (as F) | 0.25 | | | |
| titanium ammonium fluoride | (as F) | | | | |
| sodium silicofluoride | (as F) | | 0.40 | | |
| Inorganic Acids | | | | | |
| nitric acid | | | | 0.40 | 0.50 |
| phosphoric acid | | | | | |
| boric acid | | | | 0.40 | 0.40 |
| Organic Acids | | | | | |
| phytic acid | | | | | |
| tannic acid | | | | | |
| Tungsten and Molybdenum Compounds | | | | | |
| tungstic acid | (as WO$_4$) | | | 0.32 | |
| Na tungstate | (as WO$_4$) | 0.60 | | | 0.32 |
| Ca tungstate | (as WO$_4$) | | 0.54 | | |
| K tungstate | (as WO$_4$) | | | | 0.10 |
| molybdic acid | (as MoO$_4$) | | | 0.33 | |
| Na molybdate | (as MoO$_4$) | | | | |
| Ca molybdate | (as MoO$_4$) | | | | |
| K molybdate | (as MoO$_4$) | | | | |
| Additives | | | | | |
| ferric fluoride | (as FeF$_3$) | | | | |
| black pigment | (solids) | | | | |
| pH | | 2.4 | 3.1 | 2.9 | 3.3 |

| Production Example No. | | I | J | K | L |
|---|---|---|---|---|---|
| Resin (solids) | | 200 | 50 | 50 | 50 |
| Cr$^{6+}$ | | 2.00 | 2.00 | 2.00 | 0.80 |
| Cr$^{3+}$ | | | | | 0.40 |
| Fluoride or Complex Fluoride | | | | | |
| hydrogen fluoride | (as F) | 1.00 | 1.00 | 1.00 | 0.45 |
| boron hydrogen fluoride | (as F) | | | | |
| lithium borofluoride | (as F) | | | | |
| zirconium hydrogen fluoride | (as F) | | | | |
| potassium fluozirconate | (as F) | | | | |
| titanium ammonium fluoride | (as F) | | | | |
| sodium silicofluoride | (as F) | | | | |
| Inorganic Acids | | | | | |
| nitric acid | | | 0.50 | 0.40 | 0.40 | 0.30 |
| phosphoric acid | | | | | 1.45 |

TABLE I-continued

| Components In The Aqueous Coating Composition (g/L) | | | | | | |
|---|---|---|---|---|---|---|
| boric acid | | 0.40 | 0.40 | 0.40 | | |
| Organic Acids | | | | | | |
| phytic acid | | | | | | |
| tannic acid | | | | | | |
| Tungsten and Molybdenum Compounds | | | | | | |
| tungstic acid | (as WO$_4$) | | | | | |
| Na tungstate | (as WO$_4$) | 0.32 | | | 0.39 | |
| Ca tungstate | (as WO$_4$) | | | 0.33 | | |
| K tungstate | (as WO$_4$) | | | 0.20 | | |
| molybdic acid | (as MoO$_4$) | | | | | |
| Na molybdate | (as MoO$_4$) | | | | | |
| Ca molybdate | (as MoO$_4$) | | 0.40 | | | |
| K molybdate | (as MoO$_4$) | 0.10 | 0.31 | | | |
| Additives | | | | | | |
| ferric fluoride | (as FeF$_3$) | | | | | |
| black pigment | (solids) | | | | | |
| pH | | 3.4 | 3.0 | 3.1 | 2.5 | |

| Production Example No. | | M | N | O | P | Q |
|---|---|---|---|---|---|---|
| Resin (solids) | | 50 | 100 | 100 | 50 | 50 |
| Cr$^{6+}$ | | 1.40 | 1.00 | 1.00 | 1.00 | |
| Cr$^{3+}$ | | 0.70 | | | | |
| Fluoride or Complex Fluoride | | | | | | |
| hydrogen fluoride | (as F) | 0.65 | 1.80 | 1.80 | 1.20 | 1.20 |
| boron hydrogen fluoride | (as F) | | | | | |
| lithium borofluoride | (as F) | | | | | |
| zirconium hydrogen fluoride | (as F) | | | | | |
| potassium fluozirconate | (as F) | | | | | |
| titanium ammonium fluoride | (as F) | | | | | |
| sodium silicofluoride | (as F) | | | | | |
| Inorganic Acids | | | | | | |
| nitric acid | | | 0.35 | 0.35 | | |
| phosphoric acid | | 1.05 | | | | |
| boric acid | | | 0.40 | 0.40 | | |
| Organic Acids | | | | | | |
| phytic acid | | | 0.24 | | | |
| tannic acid | | | | 0.40 | | |
| Tungsten and Molybdenum Compounds | | | | | | |
| tungstic acid | (as WO$_4$) | | | | | |
| Na tungstate | (as WO$_4$) | 0.60 | 0.60 | 0.60 | | |
| Ca tungstate | (as WO$_4$) | | | | | |
| K tungstate | (as WO$_4$) | | | | | |
| molybdic acid | (as MoO$_4$) | | | | | |
| Na molybdate | (as MoO$_4$) | | | | | |
| Ca molybdate | (as MoO$_4$) | | | | | |
| K molybdate | (as MoO$_4$) | | | | | |
| Additives | | | | | | |
| ferric fluoride | (as FeF$_3$) | | | | | 3.00 |
| black pigment | (solids) | | | 0.50 | | 1.40 |
| pH | | 2.7 | 3.1 | 3.3 | 3.1 | 3.3 |

TABLE 2

| | Example | | | | | | | | | |
|---|---|---|---|---|---|---|---|---|---|---|
| | 1 | 2 | 3 | 4 | 5 | 6 | 7 | 8 | 9 | 10 |
| Composition Production Number | A | B | C | D | E | F | G | H | I | J |
| Coating substrate | | | | | | | | | | |
| cold-rolled steel sheet | | | | | X | | | | | |
| galvannealed | | | | | | | | X | | |
| hot-dipped zinc-plated | | | | | | | | | | |

TABLE 2-continued

|  |  |  |  |  |  |  |  |  |  |  |
|---|---|---|---|---|---|---|---|---|---|---|
| steel sheet |  |  |  |  |  |  |  |  |  |  |
| electrogalvanized steel sheet |  |  |  |  |  |  |  |  |  |  |
| aluminum sheet | X | X | X | X |  | X | X |  | X | X |
| Chromium Rinse Treatment |  |  |  |  |  |  |  |  |  |  |
| Coating Add-on (g/m²) | 12 | 10 | 13 | 11 | 12 | 12 | 10 | 13 | 18 | 10 |
| Chromium Add-on (mg/m²) | 110 | 120 | 100 | 95 | 85 | 110 | 100 | 95 | 100 | 110 |
| Coating Properties |  |  |  |  |  |  |  |  |  |  |
| adherence (checkerboard peeling) |  |  |  |  |  |  |  |  |  |  |
| a | 100 | 100 | 100 | 100 | 100 | 100 | 100 | 100 | 100 | 100 |
| b | 100 | 100 | 100 | 100 | 100 | 100 | 100 | 100 | 100 | 98 |
| adherence (Dupont impact) |  |  |  |  |  |  |  |  |  |  |
| a | 40 | 40 | 40 | 40 | 40 | 40 | 40 | 40 | 40 | 30 |
| b | 40 | 30 | 40 | 40 | 30 | 40 | 30 | 30 | 40 | 30 |
| corrosion resistance | 0 | 0.5 | 0 | 0.5 | 0.5 | 0 | 0.5 | 0.5 | 0 | 1.0 |

|  | Example |  |  |  |  | Comparison Example |  |  |  |  |
|---|---|---|---|---|---|---|---|---|---|---|
|  | 11 | 12 | 13 | 14 | 15 | 1 | 2 | 3 | 4 | 5 |
| Composition Production Number | K | L | M | N | O | P |  | Q |  |  |
| Coating substrate |  |  |  |  |  |  |  |  |  |  |
| cold-rolled steel sheet |  | X |  |  |  | X | X | X |  |  |
| galvannealed hot-dipped zinc-plated steel sheet |  |  |  | X |  |  |  |  | X |  |
| electrogalvanized steel sheet |  |  | X |  | X |  |  |  |  | X |
| aluminum sheet | X |  |  |  |  |  |  |  |  |  |
| Chromium Rinse Treatment |  |  |  |  |  | X | X | X | X | X |
| Coating Add-on (g/m²) | 10 | 13 | 14 | 16 | 16 | 20 | 20 | 22 | 18 | 18 |
| Chromium Add-on (mg/m²) | 100 | 95 | 90 | 100 | 90 | 80 | 275 | 200 | 220 | 250 |
| Coating Properties |  |  |  |  |  |  |  |  |  |  |
| adherence (checkerboard peeling) |  |  |  |  |  |  |  |  |  |  |
| a | 100 | 100 | 100 | 100 | 100 | 100 | 100 | 100 | 100 | 100 |
| b | 98 | 100 | 100 | 100 | 100 | 100 | 100 | 100 | 98 | 95 |
| adherence (Dupont impact) |  |  |  |  |  |  |  |  |  |  |
| a | 30 | 40 | 40 | 40 | 40 | 20 | 30 | 20 | 20 | 20 |
| b | 30 | 30 | 30 | 40 | 40 | 20 | 20 | 20 | 20 | 20 |
| corrosion resistance | 1.0 | 1.0 | 0.5 | 0.5 | 0.5 | 4.5 | 3.0 | 3.0 | 3.5 | 3.5 |

We claim:

1. An aqueous autodeposition coating composition having a pH in the range of about 1.6 to about 5.0 which comprises:
   a) a water dispersible or water-soluble organic film forming resin;
   b) at least one of fluoride ion or fluoride ion and complex fluoride ion;
   c) at least one of water-soluble hexavalent chromium ion or water-soluble hexavalent chromium ion and trivalent chromium ion;
   d) at least one of tungstate ion and molybdate ion; and
   e) water.

2. An aqueous autodeposition coating composition of claim 1 containing a pH adjusting amount of at least one acid selected from the group consisting of nitric and, phosphoric acid, boric acid, phytic acid and tannic acid.

3. An autodeposition coating composition of claim 1 wherein the organic film forming resin comprises at least one film forming resin selected from the group consisting of urethane resin, epoxy resin, polyester resin, and a resin comprising a residue of at least one monomer selected form the group consisting of methyl acrylate, ethyl acrylate or butyl acrylate, 2-hydroxy ethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, ethylene, styrene, vinyl chloride, vinylidene chloride, vinyl acetate, acrylic acid and methacrylic acid.

4. An autodeposition coating composition of claim 1 containing from 5 to 550 grams/liter of film forming resin.

5. An autodeposition coating composition of claim 2 containing from 5 to 550 grams/liter of film forming resin.

6. An autodeposition coating composition of claim 1 containing from 0.1 to 5 grams per liter of fluoride ion or fluoride ion and complex fluoride ion measured as fluorine.

7. An autodeposition coating composition of claim 1 containing 0.1 to 20 grams/liter of total chromium.

8. An autodeposition coating composition of claim 1 containing from 0.1 to 5 grams/liter of at least one of tungstate ion and molybdate ion.

9. An autodeposition coating composition of claim 1 which comprises:
  a) 5 to 550 grams/liter of the water soluble or water dispersible film forming resin;
  b) 0.1 to 5 grams/liter of fluoride ion or fluoride ion and complex fluoride ion measured as fluorine;
  c) 0.1 to 20 grams/liter total chromium; and
  d) 0.1 to 5 grams/liter of at least one of tungstate ion and molybdate ion.

10. An autodeposition coating of claim 2 comprising:
  a) 5 to 550 grams/liter of the water soluble or water dispersible film forming resin;
  b) 0.1 to 5 grams/liter of fluoride ion or fluoride ion and complex fluoride ion measured as fluorine;
  c) 0.1 to 20 grams/liter total chromium; and
  d) 0.1 to 5 grams/liter of at least one of tungstate ion and molybdate ion.

11. An autodeposition coating of claim 3 which comprises:
  a) 5 to 550 grams/liter of the water soluble or water dispersible film forming resin;
  b) 0.1 to 5 grams/liter of fluoride ion or fluoride ion and complex fluoride ion measured as fluorine;
  c) 0.1 to 20 grams/liter total chromium; and
  d) 0.1 to 5 grams/liter of at least one of tungstate ion and molybdate ion.

12. An autodeposition coating of claim 9 wherein the organic film forming resin is present at from 50 to 100 grams/liter.

13. An autodeposition coating of claim 9 containing from 0.5 to 3 grams/liter of fluoride ion or fluoride ion and complex fluoride ion measured as fluorine.

14. A composition of claim 9 containing from 0.5 to 2 grams per liter of total chromium.

15. An autodeposition coating composition having a pH in the range of about 1.6 to about 5.0 which comprises:
  a) 5 to 550 grams/liter of a water soluble or water dispersible film forming resin;
  b) 0.1 to 5 grams per liter of fluoride ion or fluoride ion and complex fluoride ion measured as fluorine;
  c) 0.1 to 20 grams per liter total chromium comprising hexavalent chromium ion and trivalent chromium ion;
  d) 0.1 to 5 grams/liter of at least one of tungstate ion and molybdate ion, wherein the ratio of hexavalent chromium: trivalent chromium is from 0.6 to 5.

16. A composition of claim 15 which comprises
  a) 50 to 100 grams/liter organic film forming resin;
  b) 0.5 to 3 grams/liter fluoride ion or fluoride ion and complex fluoride ion measured as fluorine;
  c) 0.5 to 2 grams/liter total chromium; and
  d) 0.3 to 2 grams/liter of at least one of tungstate ion and molybdate ion.

17. A composition of claim 16 wherein the organic film forming resin comprises at least one film forming resin selected from the group consisting of urethane resin, epoxy resin, polyester resin, and a resin containing a residue of at least one monomer selected from the group consisting of methyl acrylate, ethyl acrylate or butyl acrylate, 2-hydroxy ethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, acrylamide, methacrylamide, ethylene, styrene, vinyl chloride, vinylidene chloride, vinyl acetate, acrylic acid and methacrylic acid.

* * * * *